(12) United States Patent
Xu et al.

(10) Patent No.: US 11,084,057 B2
(45) Date of Patent: Aug. 10, 2021

(54) WHEEL BOLT HOLE PROTECTION PLUG PLACING DEVICE

(71) Applicant: CITIC Dicastal CO., LTD, Qinhuangdao (CN)

(72) Inventors: Zuo Xu, Qinhuangdao (CN); Guoyuan Xiong, Qinhuangdao (CN); Weidong Liu, Qinhuangdao (CN); Na Zhang, Qinhuangdao (CN); Liangjian Yue, Qinhuangdao (CN); Liguang Xie, Qinhuangdao (CN); Jing Wang, Qinhuangdao (CN); Shujuan Li, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 228 days.

(21) Appl. No.: 16/404,401

(22) Filed: May 6, 2019

(65) Prior Publication Data
US 2020/0038895 A1 Feb. 6, 2020

(30) Foreign Application Priority Data
Jul. 31, 2018 (CN) .......................... 201810855574.5

(51) Int. Cl.
| | | |
|---|---|---|
| *B05B 12/32* | (2018.01) | |
| *B05B 12/30* | (2018.01) | |
| *B60B 7/06* | (2006.01) | |
| *B05B 12/26* | (2018.01) | |
| *B05C 13/02* | (2006.01) | |
| *B05C 21/00* | (2006.01) | |
| *B05B 13/02* | (2006.01) | |
| *B60B 30/08* | (2006.01) | |

(52) U.S. Cl.
CPC .............. *B05B 12/30* (2018.02); *B05B 12/26* (2018.02); *B05B 12/32* (2018.02); *B05B 13/0285* (2013.01); *B05C 13/02* (2013.01); *B05C 21/005* (2013.01); *B60B 7/068* (2013.01); *B60B 30/08* (2013.01)

(58) Field of Classification Search
None
See application file for complete search history.

(56) References Cited

U.S. PATENT DOCUMENTS

| | | | |
|---|---|---|---|
| 10,155,267 B1 * | 12/2018 | Yang | B23B 31/18 |
| 10,328,497 B1 * | 6/2019 | Liu | B05B 13/0285 |
| 10,363,610 B2 * | 7/2019 | Liu | B23B 39/168 |
| 10,751,807 B2 * | 8/2020 | Liu | B23Q 3/062 |
| 10,752,064 B2 * | 8/2020 | Liu | B23Q 3/062 |
| 2015/0273493 A1 * | 10/2015 | Xue | B21H 1/10 239/224 |

(Continued)

*Primary Examiner* — Charles Capozzi
(74) *Attorney, Agent, or Firm* — Calfee, Halter & Griswold LLP (57) ABSTRACT

The present application provides a wheel bolt hole protection plug placing device, which includes a frame, a lifting cylinder, guiding shafts, high precision linear bearings, a flange, a connecting shaft, a roller way, a bracket, a first base, a first bearing, a first sleeve, a rotating cylinder with braking function, an end cap, a second base, a second bearing, a second sleeve, a shaft, first linear bearings, contactors, springs, a synchronous cam, a gland, a visual sensor, a mounting frame, a first linear guiding rail, a first guiding rail sliding seat, a first screw nut, a first screw, a first servo motor and so on.

7 Claims, 5 Drawing Sheets

(56) References Cited

U.S. PATENT DOCUMENTS

| | | | | |
|---|---|---|---|---|
| 2018/0126778 A1* | 5/2018 | Fisher | ............... | B60B 7/066 |
| 2018/0304294 A1* | 10/2018 | Riemrich | ............ | B05B 12/30 |
| 2018/0354041 A1* | 12/2018 | Yang | ................ | B23B 31/18 |
| 2019/0314845 A1* | 10/2019 | Rookie | .............. | B05B 12/26 |
| 2020/0038965 A1* | 2/2020 | Liu | ................... | B23Q 3/183 |
| 2020/0141710 A1* | 5/2020 | Liu | ................... | G01B 21/16 |

* cited by examiner

WHEEL BOLT HOLE PROTECTION PLUG PLACING DEVICE

CROSS-REFERENCE TO RELATED APPLICATIONS

This application claims priority to Chinese Patent Application No. 201810855574.5 filed on Jul. 31, 2018, which is hereby incorporated by reference in its entirety.

TECHNICAL FIELD

The application relates to a device for wheel spraying process, in particular to a device for efficiently placing bolt hole protection before wheel spraying process.

BACKGROUND ART

In the automobile wheel production industry, before the wheel spraying process, it is necessary to place a bolt hole protection into the wheel bolt hole to prevent the cone surface of the bolt hole from being painted. If the cone surface of the bolt hole is painted, it may lead to unqualified bolt hole pull-out force, thus causing potential security risks. In the automobile wheel production industry, bolt hole protections are usually placed manually. This type of work has the disadvantages of high labor intensity, lack of protection and so on.

SUMMARY OF THE INVENTION

The object of the present application is to provide a wheel bolt hole protection plug placing device.

In order to achieve the above object, the technical solution of the present application is as follows: a wheel bolt hole protection plug placing device, which includes a frame, a lifting cylinder, guiding shafts, high precision linear bearings, a flange, a connecting shaft, a roller way, a bracket, a first base, a first bearing, a first sleeve, a rotating cylinder with braking function, an end cap, a second base, a second bearing, a second sleeve, a shaft, first linear bearings, contactors, springs, a synchronous cam, a gland, a visual sensor, a mounting frame, a first linear guiding rail, a first guiding rail sliding seat, a first screw nut, a first screw, a first servo motor, a suspension, a second linear guiding rail, a second guiding rail sliding seat, a second screw nut, a second screw, a second servo motor, a strong electromagnet, an iron block, a protecting sleeve, bolt hole protecting plugs, a conical support, second linear bearings, bearing seats, floating shafts, a connecting plate, a mounting plate, a miniature cylinder, a support and a sliding frame.

The lifting cylinder is mounted on the frame; the four high precision linear bearings are uniformly arranged on the frame, one end of each of the four guiding shafts passes through the four high precision linear bearings, and the other end thereof is fixed on the bracket; the guiding shafts and the high precision linear bearings have a precise small clearance fit; the output shaft of the lifting cylinder is connected with the bottom end of the bracket. Through the precise small clearance fit between the guiding shafts and the high precision linear bearings, the lifting cylinder drives the bracket to move vertically with high precision.

The rotating cylinder with braking function, the second sleeve and the second base are mounted on the first sleeve; the gland encloses the second bearing and the shaft in the second base, and the two ends of the shaft are respectively connected with the output shaft of the rotating cylinder with braking function and the synchronous cam, the three or more first linear bearings are uniformly mounted on the side wall of the second sleeve, there are three or more curved surfaces uniformly distributed on the side wall of the synchronous cam; the outer ends of the three or more contactors are respectively pierced with the springs and the first linear bearings, and the inner ends thereof are respectively connected with an equal number of curved surfaces of the high precision synchronous cam of the same number, the two ends of the springs are respectively in contact with the first linear bearings and the end surface of the contactors, the springs always have elastic force, so that the inner ends of the contactors are always pressed against the synchronous cam, and the first sleeve is mounted on the first base through the first bearing and the end cap.

The support is fixed on the bracket; the miniature cylinder is mounted on the support through the mounting plate; the output shaft of the miniature cylinder is connected with the connecting plate; the two symmetrical second linear bearings are mounted on the support through the bearing seats; the two floating shafts are respectively pierced with the corresponding second linear bearings; the upper end surfaces of the two floating shafts are connected with the conical support and the lower end surfaces are connected with the connecting plate; and the visual sensor is mounted on the frame.

Through the second bearing and the shaft, the rotating cylinder with braking function may drive the synchronous cam to rotate; the curved surfaces uniformly distributed on the side wall of the synchronous cam push the series of contactors to move synchronously towards the radial outer side of the synchronous cam, so that the pitch diameter formed on the outer sides of the series of contactors is increased and may be fixed at specific positions.

During the reset of the rotating cylinder with braking function, the springs compress the end surfaces of the contactors, so that the inner ends of the contactors always contact with the synchronous cam, and the series of contactors move synchronously towards the radial inner side of the synchronous cam.

Through the second linear bearings, the miniature cylinder may drive the conical support to move vertically with high precision.

The second servo motor, the second screw and the second linear guiding rail are mounted on the suspension; the output shaft of the second servo motor is connected with the second screw; the sliding frame is connected with the second linear guiding rail through the second guiding rail sliding seat; the sliding frame is connected with the second screw through the second screw nut, in which the second screw nut is engaged with the second screw; and the rotation number and the steering of the second servo motor is controlled by the engagement of the second screw nut and the second screw, thus the sliding frame may be controlled to move horizontally along the second linear guiding rail.

The first servo motor, the first screw and the first linear guiding rail are mounted on the sliding frame; the output shaft of the first servo motor is connected with the first screw; the mounting frame is connected with the first linear guiding rail through the first guiding rail sliding seat; the mounting frame is connected with the first screw through the first screw nut, in which the first screw nut is engaged with the first screw; and the rotation number and the steering of the first servo motor is controlled by the engagement of the first screw nut and the first screw is controlled by the engagement of the first screw nut and the first screw, thus the mounting frame may be controlled to move vertically along the first linear guiding rail.

The strong electromagnet is mounted on the mounting frame through the protecting sleeve; the iron block is fixed at the top of the bolt hole protecting plug; and the inner hole at the bottom of the protecting sleeve is a conical hole, and may cooperate with the conical surface of the upper end surface of the bolt hole protecting plug. Through the suction to the iron block by the strong electromagnet, the conical surface of the upper end surface of the bolt hole protecting plug may be sucked in the inner hole of the bottom end of the protecting sleeve with high precision and reliability.

Before actual use, the rotating cylinder with braking function is not in operation, the springs are in the maximum length, and the outer diameters of the series of contactors are the minimum diameters; through the suction to the iron block by the strong electromagnet, the conical surface of the upper end surface of the bolt hole protecting plug may be sucked in the inner hole of the bottom end of the protecting sleeve with high precision and reliability; and the miniature cylinder is in the contraction state, and the conical support is at the lowest point.

In actual use, through the visual sensor and the logistics system, the wheels are conveyed to the position directly above the positioning part. Through the cooperation of the guiding shafts and the high precision linear bearings, the lifting cylinder is controlled to lift the wheels to the designated position.

The flange surface of the wheel is placed on the upper end surface of the first sleeve, the series of contactors are extended into the central hole of the wheel, and one of the windows of the wheel is positioned above the conical support. Through the second bearing and the shaft, the rotating cylinder with braking function may drive the synchronous cam to rotate, the curved surfaces uniformly distributed on the side walls of the synchronous cam push the series of contactors to move synchronously towards the radial outer side of the synchronous cam, so that the series of contactors eventually tightens the central hole of the wheel, and the rotating cylinder with braking function fixes the synchronous cam and the series of contacts in this state, thereby completing the radial positioning of the wheel. The miniature cylinder is communicated with high-pressure air. During the slow rise of the conical support, one side of the conical support gradually contacts the corresponding side of the specific window of the wheel. Under the combined action of the thrust of the miniature cylinder and the gravity of the wheel, one side of the conical support generates lateral circumferential thrust on the contact side of the wheel window, and at the same time, under the combined action of friction forces generated by the first bearing and the flange surface of the wheel with the upper end surface of the first sleeve, the radial positioning mechanism and the wheel rotate around the center of first bearing. The other side of conical support gradually contacts with the corresponding side of the spoke of the wheel, thus completing the circumferential positioning of the wheel. So far, the positioning work of the wheel has been completed.

By controlling the rotation number and the steering of first servo motors and second servo motor, the mounting frame may be controlled to move directly above the wheel. At this time, all the bolt holes of the wheel are aligned with wheel bolt hole protection plugs of the same number, and there is a space of 2 mm. Then, the power of the strong electromagnet is cut off, and the bolt hole protection plugs are accurately placed in the bolt holes of the wheel under the action of their own gravity. At this point, the placement work of the wheel bolt hole protection plugs is completed. The wheel is transported to the spraying rack through the transfer structure for spraying, and the above operations are repeated in turn to start the placement work of the bolt hole protection plugs of the next wheel.

The application may meet the requirement of high-efficiency placement of bolt hole protection during the wheel spraying process, and has the characteristics of simple structure, convenient manufacture, stable performance, high positioning precision and simple operation, and is suitable for automatic mass production.

In which, 1—frame, 2—lifting cylinder, 3—guiding shaft, 4—high precision linear bearing, 5—flange, 6—connecting shaft, 7—roller way, 8—bracket, 9—first base, 10—first bearing, 11—first sleeve, 12—rotating cylinder with braking function, 13—end cap, 14—second base, 15—second bearing, 16—second sleeve, 17—shaft, 18—first linear bearing, 19—contactor, 20—spring, 21—synchronous cam, 22—gland, 23—visual sensor, 24—mounting frame, 25—first linear guiding rail, 26—first guiding rail sliding seat, 27—first screw nut, 28—first screw, 29—first servo motor, 30—suspension, 31—second linear guiding rail, 32—second guiding rail sliding seat, 33—second screw nut, 34—second screw, 35—second servo motor, 36—strong electromagnet, 37—iron block, 38—protecting sleeve, 39—bolt hole protecting plug, 40—conical support, 41—second linear bearing, 42—bearing seat, 43—floating shaft, 44—connecting plate, 45—mounting plate, 46—miniature cylinder, 47—support, 48—sliding frame.

DETAILED DESCRIPTION OF THE INVENTION

The details and operation conditions of the specific device of the present application are given below in conjunction with the illustration of the accompanying drawings.

Figure 1:
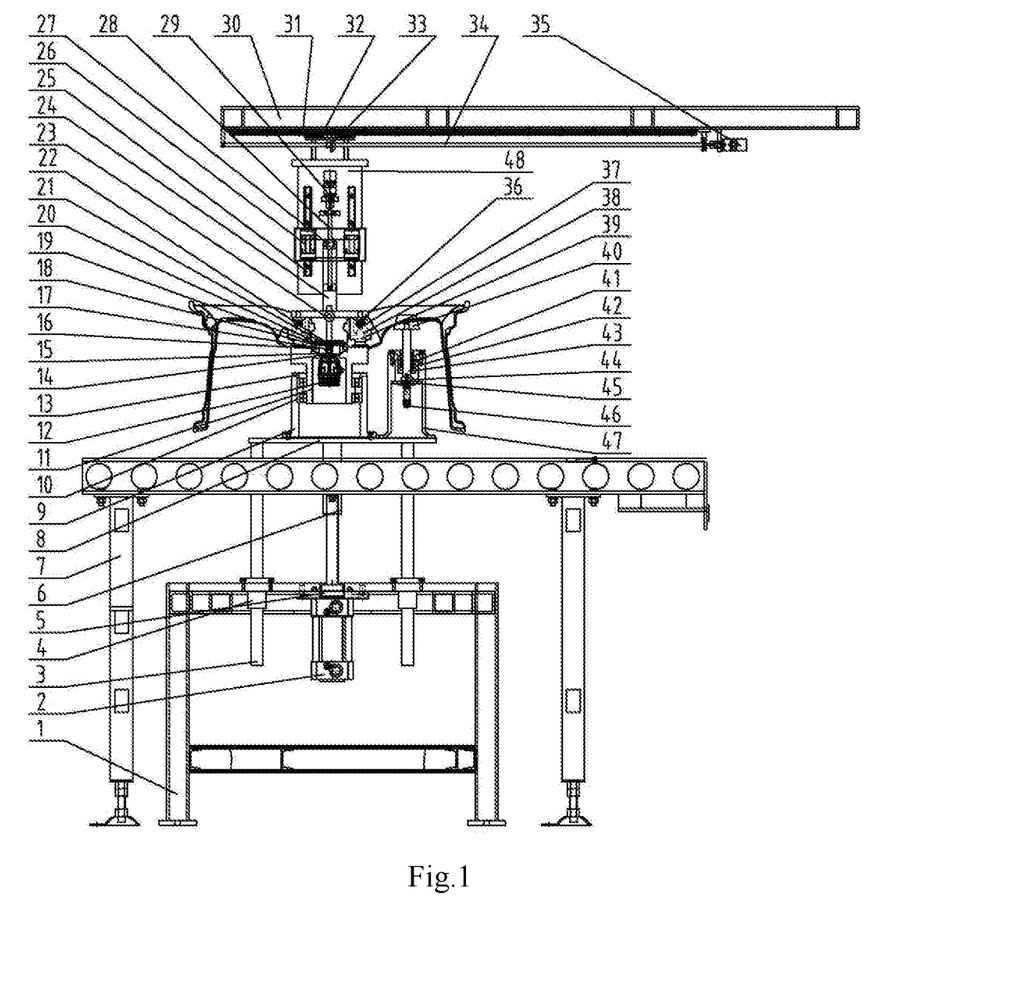
FIG. 1 is a schematic diagram of the wheel bolt hole protection plug placing device of the present application.

The application provides a wheel bolt hole protection plug placing device, which includes a frame 1, a lifting cylinder 2, guiding shafts 3, high precision linear bearings 4, a flange 5, a connecting shaft 6, a roller way 7, a bracket 8, a first base 9, a first bearing 10, a first sleeve 11, a rotating cylinder 12 with braking function, an end cap 13, a second base 14, a second bearing 15, a second sleeve 16, a shaft 17, first linear bearings 18, contactors 19, springs 20, a synchronous cam 21, a gland 22, a visual sensor 23, a mounting frame 24, a first linear guiding rail 25, a first guiding rail sliding seat 26, a first screw nut 27, a first screw 28, a first servo motor 29, a suspension 30, a second linear guiding rail 31, a second guiding rail sliding seat 32, a second screw nut 33, a second screw 34, a second servo motor 35, a strong electromagnet 36, an iron block 37, a protecting sleeve 38, bolt hole protecting plugs 39, a conical support 40, second linear bearings 41, bearing seats 42, floating shafts 43, a connecting plate 44, a mounting plate 45, a miniature cylinder 46, a support 47 and a sliding frame 48.

The lifting cylinder 2 is mounted on the frame 1; the four high precision linear bearings 4 are uniformly arranged on the frame 1, one end of each of the four guiding shafts 3 passes through the four high precision linear bearings 4, and the other end thereof is fixed on the bracket 8; the guiding shafts 3 and the high precision linear bearings 4 have a precise small clearance fit; the output shaft of the lifting cylinder 2 is connected with the bottom end of the bracket 8. Through the precise small clearance fit between the guiding shafts 3 and the high precision linear bearings 4, the lifting cylinder 2 drives the bracket 8 to move vertically with high precision.

Figure 3:
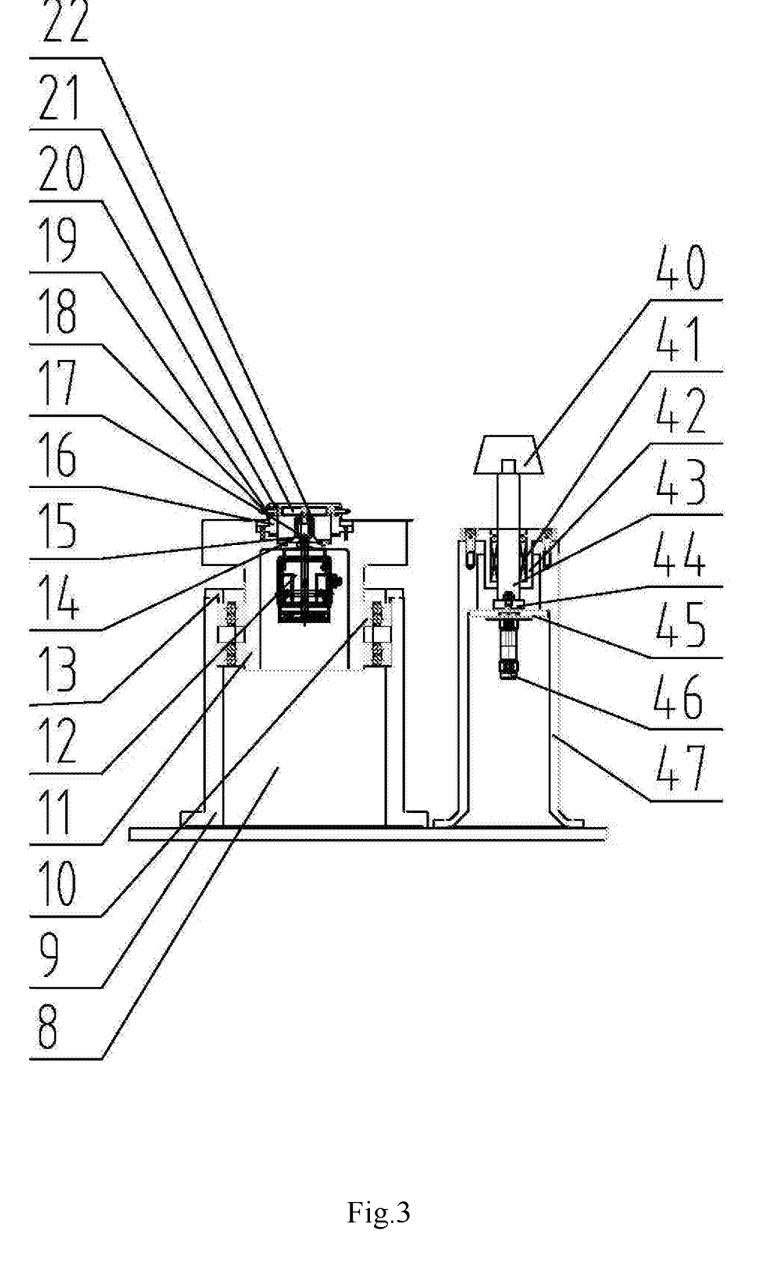
FIG. 3 is a schematic diagram of a positioning mechanism in the wheel bolt hole protection plug placing device of the application.
Figure 4:
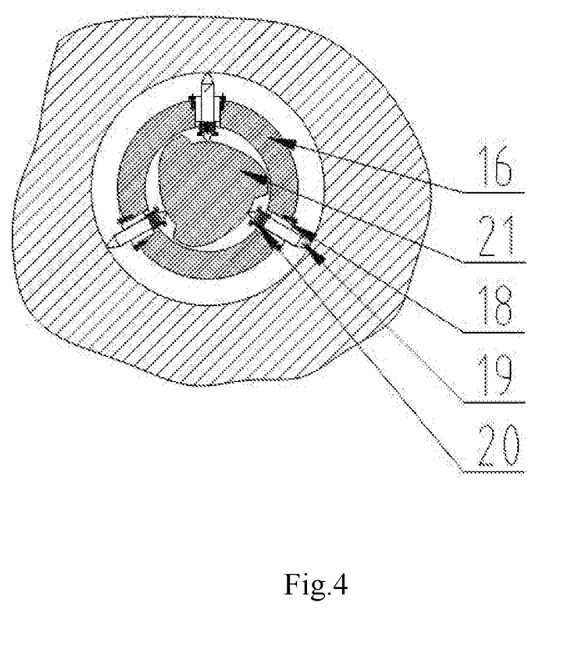
FIG. 4 is a top view of the radial positioning part in the wheel bolt hole protection plug placing device of the present application.

The rotating cylinder 12 with braking function, the second sleeve 16 and the second base 14 are mounted on the first sleeve 11; the gland 22 encloses the second bearing 15 and the shaft 17 in the second base 14, and the two ends of the shaft 17 are respectively connected with the output shaft of the rotating cylinder 12 with braking function and the synchronous cam 21, the three or more first linear bearings 18 are uniformly mounted on the side wall of the second sleeve 16, there are three or more curved surfaces uniformly distributed on the side wall of the synchronous cam 21; the outer ends of the three or more contactors 19 are respectively pierced with the springs 20 and the first linear bearings 18, and the inner ends thereof are respectively connected with an equal number of curved surfaces of the high precision synchronous cam 21 of the same number, the two ends of the springs 20 are respectively in contact with the first linear bearings 18 and the end surface of the contactors 19, the springs 20 always have elastic force, so that the inner ends of the contactors 19 are always pressed against the synchronous cam 21, and the first sleeve 11 is mounted on the first base 9 through the first bearing 10 and the end cap 13.

Figure 5:
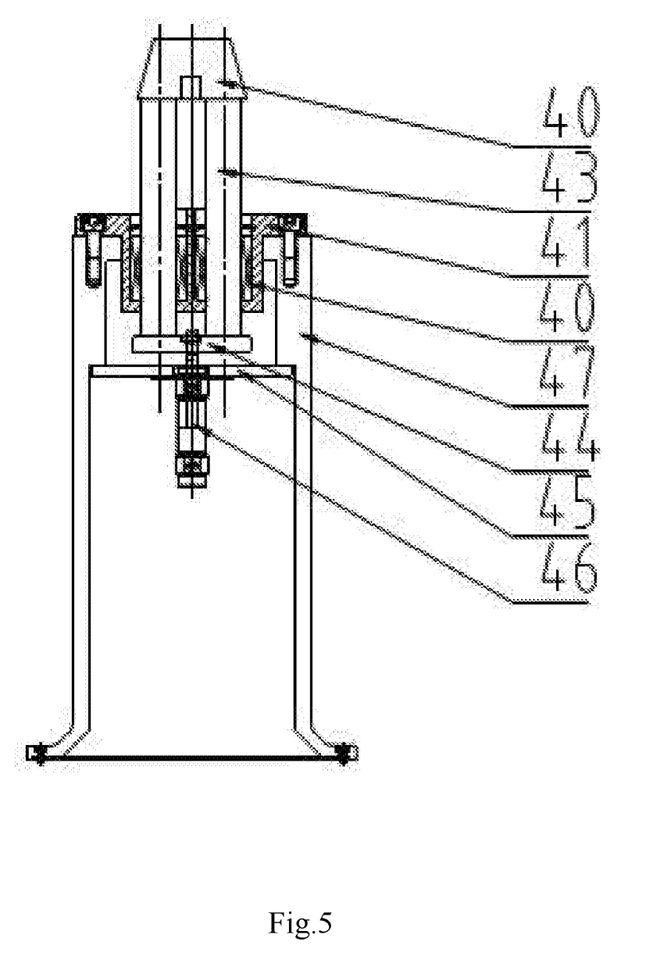
FIG. 5 is a schematic diagram of the circumferential positioning self-adjusting mechanism in the wheel bolt hole protection plug placing device of the present application.

The support 47 is fixed on the bracket 8; the miniature cylinder 46 is mounted on the support 47 through the mounting plate 45; the output shaft of the miniature cylinder 46 is connected with the connecting plate 44; the two symmetrical second linear bearings 41 are mounted on the support 47 through the bearing seats 42; the two floating shafts 43 are respectively pierced with the corresponding second linear bearings 41; the upper end surfaces of the two floating shafts 43 are connected with the conical support 40 and the lower end surfaces thereof are connected with the connecting plate 44.

Through the second bearing 15 and the shaft 17, the rotating cylinder 12 with braking function may drive the synchronous cam 21 to rotate; the curved surfaces uniformly distributed on the side wall of the synchronous cam 21 push the series of contactors 19 to move synchronously towards the radial outer side of the synchronous cam 21, so that the pitch diameter formed on the outer sides of the series of contactors 19 is increased and may be fixed at specific positions.

During the reset of the rotating cylinder 12 with braking function, the springs 20 compress the end surfaces of the contactors 19, so that the inner ends of the contactors 19 always contact with the synchronous cam 21, and the series of contactors 19 move synchronously towards the radial inner side of the synchronous cam 21.

Through the second linear bearings 41, the miniature cylinder 46 may drive the conical support 40 to move vertically with high precision.

Figure 2:
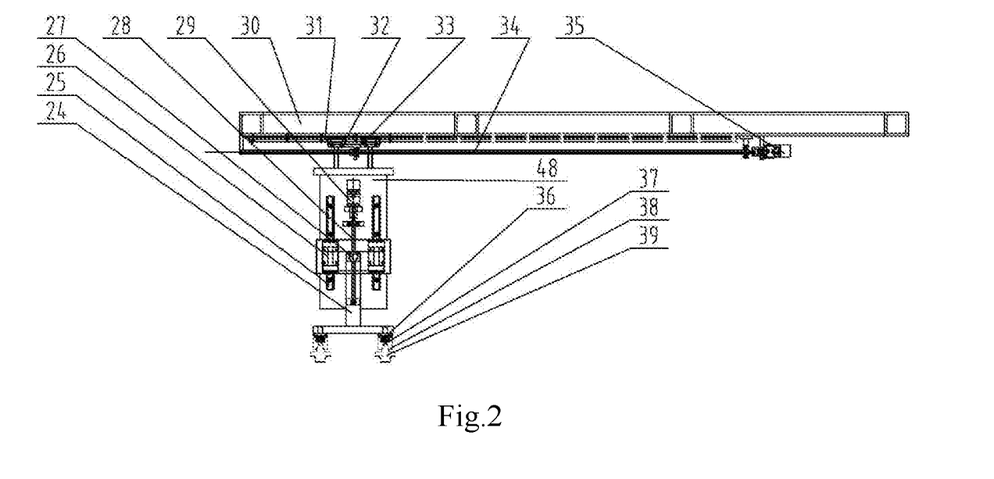
FIG. 2 is a schematic diagram of a protection plug placing mechanism in the wheel bolt hole protection plug placing device of the present application.

The second servo motor 35, the second screw 34 and the second linear guiding rail 31 are mounted on the suspension 30; the output shaft of the second servo motor 35 is connected with the second screw 34; the sliding frame 48 is connected with the second linear guiding rail 31 through the second guiding rail sliding seat 32; the sliding frame 48 is connected with the second screw 34 through the second screw nut 33, in which the second screw nut 33 is engaged with the second screw 34; and the rotation number and the steering of the second servo motor 35 is controlled by the engagement of the second screw nut 33 and the second screw 34, thus the sliding frame 48 may be controlled to move horizontally along the second linear guiding rail 31.

The first servo motor 29, the first screw 28 and the first linear guiding rail 25 are mounted on the sliding frame 48; the output shaft of the first servo motor 29 is connected with the first screw 28; the mounting frame 24 is connected with the first linear guiding rail 25 through the first guiding rail sliding seat 26; the mounting frame 24 is connected with the first screw 28 through the first screw nut 27, in which the first screw nut 27 is engaged with the first screw 28; and the rotation number and the steering of the first servo motor 29 is controlled by the engagement of the first screw nut 27 and the first screw 28, thus the mounting frame 24 may be controlled to move vertically along the first linear guiding rail 25.

The strong electromagnet 36 is mounted on the mounting frame 24 through the protecting sleeve 38; the iron block 37 is fixed at the top of the bolt hole protecting plug 39; and the inner hole at the bottom of the protecting sleeve 38 is a conical hole, and may cooperate with the conical surface of the upper end surface of the bolt hole protecting plug 39. Through the suction to the iron block 37 by the strong electromagnet 36, the conical surface of the upper end surface of the bolt hole protecting plug 39 may be sucked in the inner hole of the bottom end of the protecting sleeve 38 with high precision and reliability.

Before actual use, the rotating cylinder 12 with braking function is not in operation, the springs 20 are in the maximum length, and the outer diameters of the series of contactors 19 are the minimum diameters; through the suction to the iron block 37 by the strong electromagnet 36, the conical surface of the upper end surface of the bolt hole protecting plug 39 may be sucked in the inner hole of the bottom end of the protecting sleeve 38 with high precision and reliability; and the miniature cylinder 46 is in the contraction state, and the conical support 40 is at the lowest point.

In actual use, through the visual sensor 23 and the logistics system, the wheels are conveyed to the position directly above the positioning part. Through the cooperation of the guiding shafts 3 and the high precision linear bearings 4, the lifting cylinder 2 is controlled to lift the wheels to the designated position.

The flange surface of the wheel is placed on the upper end surface of the first sleeve 11, the series of contactors 19 are extended into the central hole of the wheel, and one of the windows of the wheel is positioned above the conical support 40. Through the second bearing 15 and the shaft 17, the rotating cylinder 12 with braking function may drive the synchronous cam 21 to rotate, the curved surfaces uniformly distributed on the side walls of the synchronous cam 21 push the series of contactors 19 to move synchronously towards the radial outer side of the synchronous cam 21, so that the series of contactors 19 eventually tightens the central hole of the wheel, and the rotating cylinder 12 with braking function fixes the synchronous cam 21 and the series of contacts 19 in this state, thereby completing the radial positioning of the wheel. The miniature cylinder 46 is communicated with high-pressure air. During the slow rise of the conical support 40, one side of the conical support 40 gradually contacts the corresponding side of the specific window of the wheel. Under the combined action of the thrust of the miniature cylinder 46 and the gravity of the wheel, one side of the conical support 40 generates lateral circumferential thrust on the contact side of the wheel window, and at the same time, under the combined action of friction forces generated by the first bearing 10 and the flange surface of the wheel with the upper end surface of the first sleeve 11, the radial positioning mechanism and the wheel rotate around the center of first bearing 10. The other side of conical support 40 gradually contacts with the corresponding side of the spoke of the wheel, thus completing the circumferential positioning of the wheel. So far, the positioning work of the wheel has been completed.

By controlling the rotation number and the steering of first servo motors 29 and second servo motor 35, the mounting frame 24 may be controlled to move directly above the wheel. At this time, all the bolt holes of the wheel are aligned with wheel bolt hole protection plugs 39 of the same number, and there is a space of 2 mm. Then, the power of the strong electromagnet 36 is cut off, and the bolt hole protection plugs 39 are accurately placed in the bolt holes of the wheel under the action of their own gravity. At this point, the placement work of the wheel bolt hole protection plugs 39 is completed. The wheel is transported to the spraying rack through the transfer structure for spraying, and the above operations are repeated in turn to start the placement work of the bolt hole protection plugs 39 of the next wheel.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel bolt hole protection plug placing device, comprising: a first frame, a lifting cylinder, four guiding shafts, a first plurality of four linear bearings, a flange, a connecting shaft, a roller way, a bracket, a first base, a fifth bearing, a first sleeve, a rotating cylinder with braking function, an end cap, a second base, a sixth bearing, a second sleeve, a first shaft, a second plurality of three or more linear bearings, three or more contactors, springs, a synchronous cam, a gland, a visual sensor, a mounting frame, a first linear guiding rail, a first guiding rail sliding seat, a first screw nut, a first screw, a first servo motor, a suspension, a second linear guiding rail, a second guiding rail sliding seat, a second screw nut, a second screw, a second servo motor, an electromagnet, an iron block, a protecting sleeve, bolt hole protecting plugs, a conical support, a third plurality of two symmetrical linear bearings, bearing seats, two floating shafts, a connecting plate, a mounting plate, a second cylinder, a second support and a sliding frame;

the lifting cylinder is mounted on the first frame; the first plurality of four linear bearings are uniformly arranged on the first frame; one end of each of the four guiding shafts passes through the first plurality of four linear bearings, and the other end of each of the four guiding shafts is fixed on the bracket; the guiding shafts and the first plurality of four linear bearings have a precise clearance fit; an output shaft of the lifting cylinder is connected with a bottom end of the bracket;

the rotating cylinder with braking function, the second sleeve and the second base are mounted on the first sleeve; the gland encloses the sixth bearing and the first shaft in the second base, and two ends of the first shaft are respectively connected with an output shaft of the rotating cylinder with braking function and the synchronous cam; the second plurality of three or more linear bearings are uniformly mounted on a side wall of the second sleeve; there are three or more curved surfaces uniformly distributed on a side wall of the synchronous cam; outer ends of the three or more contactors are respectively pierced with the springs and the second plurality of linear bearings, and inner ends of the contactors are respectively connected with an equal number of curved surfaces of the synchronous cam; two ends of the springs are respectively in contact with the second plurality of linear bearings and end surfaces of the contactors; the springs always have elastic force, so that inner ends of the contactors are always pressed against the synchronous cam; and the first sleeve is mounted on the first base through the first bearing and the end cap;

the second support is fixed on the bracket; the second cylinder is mounted on the second support through the mounting plate; an output shaft of the second cylinder is connected with the connecting plate; the third plurality of two symmetrical second linear bearings are mounted on the second support through the bearing seats; the two floating shafts are respectively pierced with the corresponding second linear bearings; upper end surfaces of the two floating shafts are connected with the conical support and lower end surfaces of the two floating shafts are connected with the connecting plate.

2. The wheel bolt hole protection plug placing device according to claim 1, wherein the second servo motor, the second screw and the second linear guiding rail are mounted on the suspension; an output shaft of the second servo motor is connected with the second screw; the sliding frame is connected with the second linear guiding rail through the second guiding rail sliding seat; the sliding frame is connected with the second screw through the second screw nut, in which the second screw nut is engaged with the second screw; and rotation number and steering of the second servo motor is controlled by the engagement of the second screw nut and the second screw, the sliding frame configured to be controlled to move horizontally along the second linear guiding rail.

3. The wheel bolt hole protection plug placing device according to claim 1, wherein the first servo motor, the first screw and the first linear guiding rail are mounted on the sliding frame; an output shaft of the first servo motor is connected with the first screw; the mounting frame is connected with the first linear guiding rail through the first guiding rail sliding seat; the mounting frame is connected with the first screw through the first screw nut, in which the first screw nut is engaged with the first screw; and rotation number and steering of the first servo motor is controlled by the engagement of the first screw nut and the first screw is controlled by the engagement of the first screw nut and the first screw, the mounting frame configured to be controlled to move vertically along the first linear guiding rail.

4. The wheel bolt hole protection plug placing device according to claim 1, wherein the electromagnet is mounted on the mounting frame through the protecting sleeve; the iron block is fixed at a top of the bolt hole protecting plug; and an inner hole at a bottom of the protecting sleeve is a conical hole, and configured to cooperate with a conical surface of an upper end surface of the bolt hole protecting plug; and through suction to the iron block by the electromagnet, the conical surface of the upper end surface of the bolt hole protecting plug is configured to be sucked in the inner hole at the bottom of the protecting sleeve.

5. The wheel bolt hole protection plug placing device according to claim 1, wherein the wheel bolt hole protection plug placing device during a wheel spraying process, through the sixth bearing and the first shaft, the rotating cylinder with braking function is configured to drive the synchronous cam to rotate; the three or more curved surfaces uniformly distributed on the side wall of the synchronous cam push the contactors to move synchronously towards a radial outer side of the synchronous cam, so that a pitch diameter formed on outer sides of the contactors is increased and configured to be fixed at specific positions.

6. The wheel bolt hole protection plug placing device according to claim 1, wherein during a reset of the rotating cylinder with braking function, the springs compress the end surfaces of the contactors, so that the inner ends of the contactors always contact the synchronous cam, and the contactors move synchronously towards an radial inner side of the synchronous cam.

7. The wheel bolt hole protection plug placing device according to claim 1, wherein through the third plurality of linear bearings, the second cylinder is configured to drive the conical support to move vertically.

* * * * *